(12) United States Patent
Felske

(10) Patent No.: US 11,506,068 B2
(45) Date of Patent: Nov. 22, 2022

(54) COMPRESSOR CASING WITH OIL TANK FOR A TURBINE ENGINE

(71) Applicant: SAFRAN AERO BOOSTERS SA, Herstal (BE)

(72) Inventor: Jean Felske, Roclenge/Geer (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 512 days.

(21) Appl. No.: 16/627,632

(22) PCT Filed: Sep. 3, 2018

(86) PCT No.: PCT/EP2018/073559
§ 371 (c)(1),
(2) Date: Dec. 30, 2019

(87) PCT Pub. No.: WO2019/076519
PCT Pub. Date: Apr. 25, 2019

(65) Prior Publication Data
US 2021/0164357 A1 Jun. 3, 2021

(30) Foreign Application Priority Data
Oct. 16, 2017 (BE) .................................. 2017/5735

(51) Int. Cl.
*F01D 9/04* (2006.01)
*F01D 25/18* (2006.01)
(Continued)

(52) U.S. Cl.
CPC ............ *F01D 9/041* (2013.01); *F01D 25/183* (2013.01); *F02C 7/14* (2013.01); *F04D 29/522* (2013.01);
(Continued)

(58) Field of Classification Search
CPC ...... F04D 29/063; F04D 29/522; F01D 25/02; F01D 25/183; F01D 9/041; F02C 7/047;
(Continued)

(56) References Cited

U.S. PATENT DOCUMENTS 4,592,204 A * 6/1986 Rice .......................... F02C 7/16
60/39.17
8,627,667 B2  1/2014 Lozier et al.
(Continued)

FOREIGN PATENT DOCUMENTS

FR   2629872 A1  10/1989
GB   1018538 A   1/1966

OTHER PUBLICATIONS

International Search Report dated Dec. 3, 2018 for Parent PCT Appl. No. PCT/EP2018/073559.

*Primary Examiner* — Igor Kershteyn
(74) *Attorney, Agent, or Firm* — James E. Walton

(57) ABSTRACT

Turbine engine assembly comprising: an external casing (28) of a low-pressure compressor (4), an annular wall (30) and an oil tank (46) with a circular chamber (48) around an axis (14) of the compressor. The wall (30) comprises an inner surface (38) delimiting an primary guide path for the flow of the compressor, and an external surface (40) radially opposite the inner surface and delimiting the internal chamber (48) of the tank (46).

16 Claims, 4 Drawing Sheets

(51) Int. Cl.
*F02C 7/14* (2006.01)
*F04D 29/52* (2006.01)

(52) U.S. Cl.
CPC .... *F05D 2220/323* (2013.01); *F05D 2230/60* (2013.01); *F05D 2240/14* (2013.01); *F05D 2260/30* (2013.01); *F05D 2260/98* (2013.01)

(58) Field of Classification Search
CPC ........ F02C 7/06; F02C 7/14; F05D 2220/323; F05D 2230/60; F05D 2240/14; F05D 2260/98; F05D 2260/30; F05D 2260/213; Y02T 50/60
See application file for complete search history.

(56) References Cited

U.S. PATENT DOCUMENTS

| | | | |
|---|---|---|---|
| 2015/0167497 A1* | 6/2015 | Hannecart | F01D 25/24 29/889.22 |
| 2018/0021711 A1* | 1/2018 | Mook | B04C 3/00 95/269 |
| 2018/0209284 A1* | 7/2018 | Day | F02C 9/18 |
| 2018/0371997 A1* | 12/2018 | van der Merwe | F02C 7/18 |
| 2018/0372001 A1* | 12/2018 | Bordoni | F01D 25/28 |
| 2020/0116081 A1* | 4/2020 | Levisse | F02C 7/06 |
| 2020/0131917 A1* | 4/2020 | Lemarchand | F04D 29/323 |

\* cited by examiner

COMPRESSOR CASING WITH OIL TANK FOR A TURBINE ENGINE

TECHNICAL FIELD

The invention relates to the structure of a turbine engine including a circular tank and a compressor. The invention also relates to an axial turbine engine, in particular an aircraft turbojet engine or an aircraft turboprop engine.

BACKGROUND ART

The operation of a turbojet engine requires a clean oil tank. This tank can be integrated in the nacelle of the turbine engine, or in the primary body; that is, between the primary flow and the secondary flow. Since the compactness remains a main constraint in a turbojet engine, the oil tank must be bent in order to fit between two annular walls delimiting the flows. The curvature of the tank is greater for high volume tank.

Reference U.S. Pat. No. 8,627,667 B2 discloses a double-flow turbojet engine with a fan, a compressor and a bypass path. The bypass is delimited by an inner wall and an outer wall which are made of a composite material with carbon fibers. The bypass contains a tank that is circular. The capacity of the tank remains limited. Moreover, such a turbojet engine has a significant drag.

Document GB 1,018,538 discloses a turbojet compressor casing with a tank 51 made of two concentric parts facing each other, and surrounding the path of air flow. Such a tank is cumbersome, and therefore has a size-related drawback and is difficult to assemble when assembling the turbine, engine.

SUMMARY OF THE INVENTION

Technical Problem

The object of the invention is to overcome at least one of the above-mentioned drawbacks in the prior art. More specifically, the invention aims to optimize the compactness of a turbine engine and the capacity of a tank. The invention also aims to provide a simple solution, chemically and mechanically resistant, lightweight, economical, reliable, easy to produce, of convenient maintenance, easy to inspect, and improving performance.

Technical Solution

The invention relates to a turbine engine assembly according to claim 1.

According to advantageous embodiments of the invention, the assembly may comprise one or more of the following features, taken separately or according to any possible technical combination:

The compressor comprises at least one annular row of blades upstream of the flange.
The assembly comprises a row of stator blades extending radially from the inner surface.
The blades are arranged axially at the position of the internal chamber.
The blades are in thermal contact with the internal chamber and the primary flow-path.
Each blade comprises a fixing platform axially overlapping the axial limits of the internal chamber of the tank.
The tank comprises an upstream end and a downstream end between which are disposed stator blades.
The tank comprises an upstream annular partition and a downstream annular partition, one of said annular partitions being axially at the axial position of a stator blade.
The axial distance between the flange and the downstream annular partition covers at least four rows of annular blades.
The annular wall is made of organic-matrix composite material.
The casing, including the composite wall, is a one-piece casing or is made of two half-shells.
The tank is formed of two half-tori.
The assembly comprises an annular seal adapted to cooperate by abrasion with a rotor of the compressor, said seal being disposed axially at the position of the annular chamber.
The wall is not hollow at the axial position of the chamber.
The wall is made of one piece between the inner surface and the outer surface and/or the wall is made of one piece at the axial position of the chamber, in particular over an angular portion of the wall around the axis.
The assembly comprises a compressor with a rotor, in particular a low-pressure compressor, the outer casing being the casing of said compressor and the tank surrounding the rotor of the compressor.
The rotor comprises a one-piece drum having a plurality of annular rows of rotor blades positioned axially at the axial position of the inner chamber.
The inner surface and the outer surface are opposite each other in the direction of the thickness of the wall and/or are axially at the same position, for example at the same position as the chamber.
The tank comprises an upstream end and a downstream end between which is placed a seal.
The upstream end and the downstream end are axially remote from the blades.
The upstream end and the downstream end are axially remote from the seal.
The seal is an abradable seal, especially with silicone, or with a nickel-polymer aluminum composition.
The thickness of the wall is less than or equal to: 10 mm, or 5 mm, or 2 mm.
The volume of the chamber is greater than or equal to: 10 liters, or 20 liters, or 50 liters, or 70 liters.
The platform is in contact with the wall.

The invention also relates, more generally, to an assembly comprising: an axis of rotation of the turbine engine, an external compressor casing with an annular wall, and a tank for liquid with a circular internal chamber about the axis of rotation , remarkable in that the wall comprises an inner circular surface defining the primary flow-path of the compressor, and an outer circular surface which defines the internal chamber of the tank.

The invention also relates to an assembly for a turbine engine, the assembly comprising: an axis of rotation of the turbine engine, an external compressor casing with an annular wall, and a tank for liquid with a circular internal chamber about the axis rotation, remarkable in that the wall comprises a portion, optionally circular, with two radially opposite surfaces, optionally according to the thickness of the portion, said surfaces comprising an inner surface and an outer surface delimiting respectively the primary flow-path of the compressor, and the internal chamber of the tank.

The invention also relates to a turbine engine stator, the stator comprising a tank with an internal chamber, a row of stator blades, an annular casing with an inner surface and an outer surface defining the chamber, and a row of compressor stator blades, said stator blades extending radially from the inner surface of the portion.

The invention also relates to a turbine engine partition, the partition comprising a compressor casing with an outer surface and an inner surface, and a row of stator blades in contact with the inner surface, which is remarkable in that the internal chamber is in contact with the outer surface.

The subject of the invention is also an angular segment of a turbine engine, said segment being made of one piece and made by additive layers manufacturing, in particular based on powder, the segment comprising a row of blades, an angular section of a tank, and a wall connecting the tank and the blades.

The subject-matter of the invention is also a turbine engine, in particular an aircraft turbojet engine, comprising an assembly, which is remarkable in that the assembly is in accordance with an embodiment as disclosed above, the tank being preferably an oil tank.

According to a preferred embodiment of the invention, the turbine engine comprises an annular separator nozzle with an oil defrosting device, the defrosting device being hydraulically connected to the oil tank.

According to a preferred advantageous embodiment of the invention, the turbine engine comprises an annular oil collector, said collector being hydraulically connected to the oil tank.

The invention also relates to a use of an external compressor casing to form a turbine engine tank, said tank having a circular shape around the axis of rotation of the turbine engine, the tank and the casing possibly forming an assembly as mentioned above.

In general, the preferred embodiments of each object of the invention can also be applied to the other objects of the invention. Each object of the invention can be combined with other objects.

Benefits of the Invention

The invention improves the compactness of the turbine engine as it brings closer and even combines the compressor and the tank. The chamber of the latter is merged with the annular wall. Substantial savings are gained by making the wall having both roles of air-flow guide and tank wall.

In addition, a thermal proximity between the tank and the blades is ensured. Thus, it becomes possible to exploit the heat exchange surfaces of the blades immersed in the cold air flow, in this case the primary flow. The heat exchange is carried out through the wall, it can be improved through the parts which are in direct thermal contact with the blades.

The merging of the tank to the casing can strengthen the latter. Indeed, the tank forms a rigid section which increases the quadratic moment of the tank.

DESCRIPTION OF THE PREFERRED EMBODIMENTS

In the following, the terms "internal" and "external" refer to a positioning relative to the axis of rotation of an axial-flow turbine engine. The axial direction corresponds to the direction along the axis of rotation of the turbine engine. The radial direction is perpendicular to the axis of rotation. Upstream and downstream are in reference to the main flow direction of the air in the turbine engine.

Figure 1:
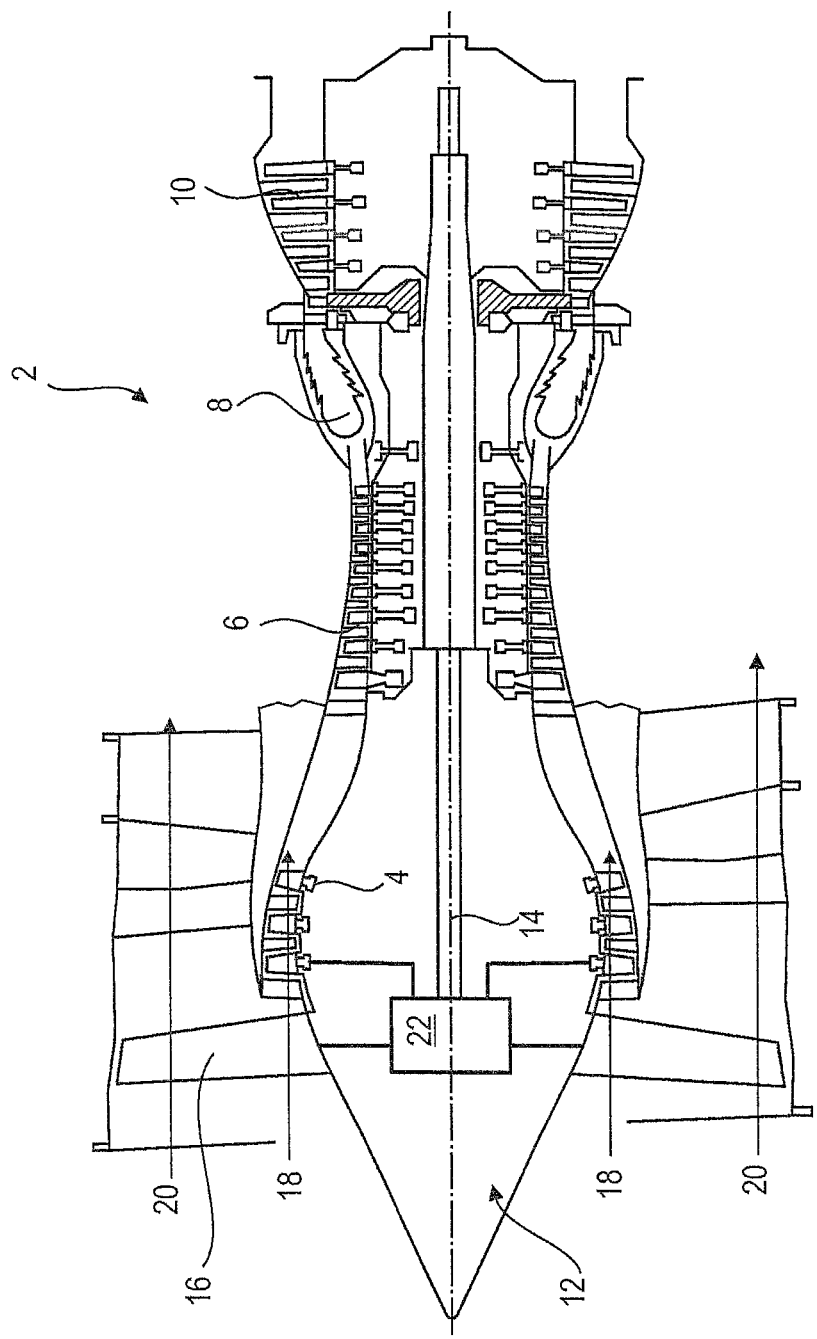
FIG. 1 represents an axial turbine engine according to the invention.

FIG. 1 is a simplified representation of an axial turbine engine. It is in this case a double-flow turbojet engine. The turbine engine 2 comprises a first compression stage or low-pressure compressor 4, a second compression stage or high-pressure compressor 6, a combustion chamber 8 and one or more stages with turbines 10. In operation, the mechanical power that the turbine 10 transmit via the central shaft to the rotor 12 sets in motion the two compressors 4 and 6. The latter comprise several rows of rotor blades associated with rows of stator blades. The rotation of the rotor about its axis of rotation 14 thus makes it possible to generate an air flow and to compress it progressively until it reaches the combustion chamber 8.

A fan 16 is coupled to the rotor 12 and generates a flow of air which splits into a primary flow 18 passing through the various aforementioned stages of the turbine engine, and into a secondary flow 20 passing through an annular duct (partially shown) along the engine to then join the primary flow at the turbine outlet.

Gearing means 22, such as one or more epicyclic reducers, can reduce the speed of rotation of the fan. The gearing means 22 can increase or reduce the speed of rotation of the low-pressure compressor 4 relative to the turbine and/ or the fan 12. The secondary flow 20 can be accelerated so as to generate a thrust reaction necessary for the flight of an airplane. The primary 18 and secondary 20 streams are coaxial annular flows fitted into one another.

The turbine engine 2 may comprise a hydraulic circuit, in particular fluidly connected to a tank The circuit can be connected to a heat exchanger for cooling the oil coming from bearings of the turbine engine and from gearing means 22.

Figure 2:
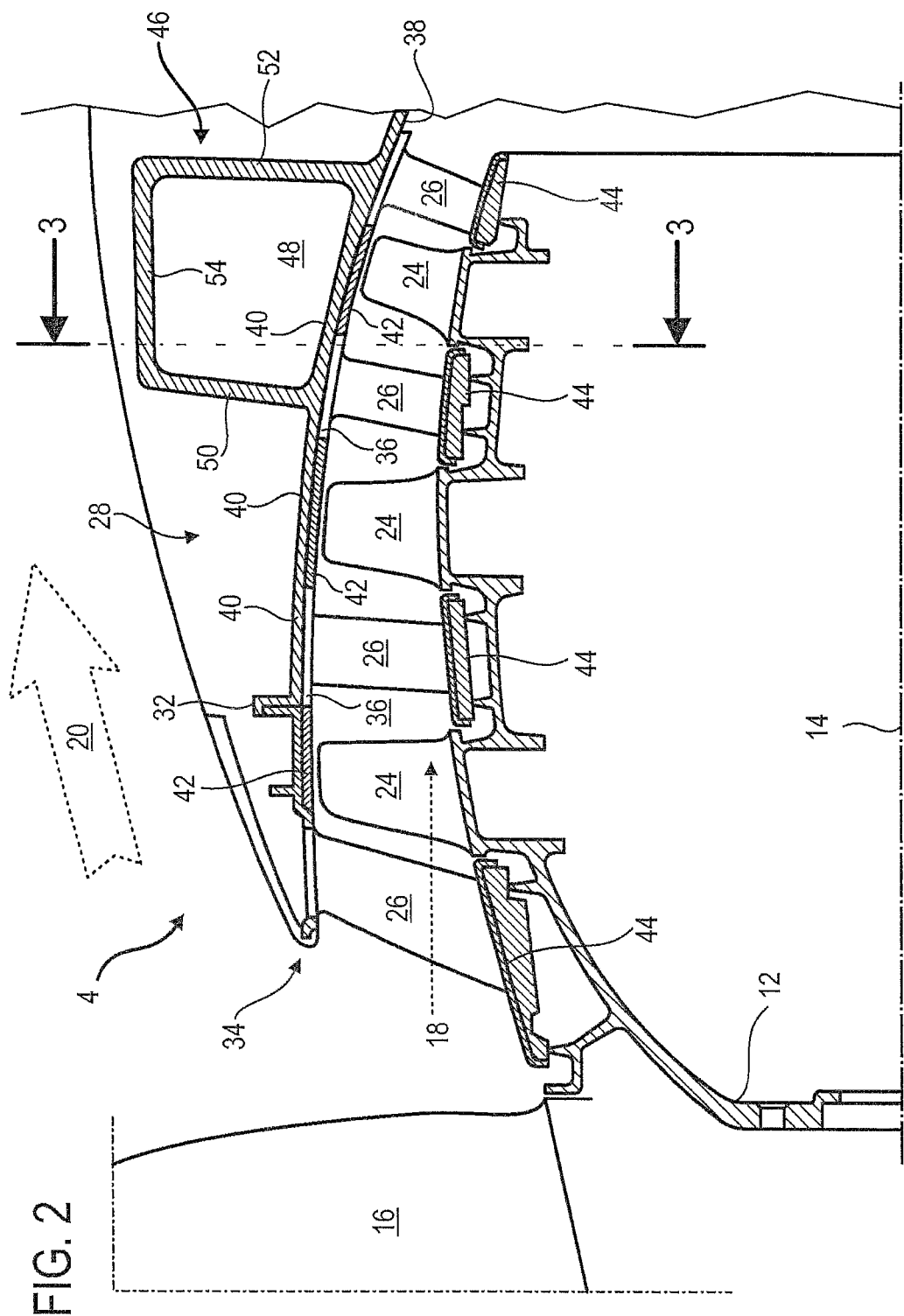
FIG. 2 is a sketch of a turbine engine compressor according to a first embodiment of the invention.

FIG. 2 is a cross-section view of a compressor of an axial turbine engine such as the engine of FIG. 1. The compressor can be a low-pressure compressor 4. The rotor 12 comprises several rows of rotor blades 24, and in this particular case three rows. The rotor can be a bladed one-piece drum, or include dovetail blades in a perimetric groove. The axis of rotation 14 is shown.

The low-pressure compressor 4 comprises several rectifiers, in this case four, each containing a row of stator blades 26. The rectifiers are associated with the fan 16 or with a row of rotor blades to straighten the direction of the air flow, so as to convert the speed of the flow into pressure, in particular into static pressure. The blades (24; 26) have concave and convex surfaces configured to compress the flow.

The stator blades 26 extend essentially radially from an outer casing 28. They can be screwed, glued or welded to the annular wall 30. Thanks to annular flanges 32, the casing 28 can be connected to the support of the fan of the turbine engine, or to the separation nozzle 34 dividing the primary flow 18 and the secondary flow 20 downstream of the blower 16. The wall 30 may be made of composite material with organic matrix and carbon fibers, or be made of metal such as titanium. Its thickness, measured radially, can be between 3 mm and 5 mm inclusive.

The stator blades 26 may be provided with attachment platforms 36. These are pressed against the inner circular surface 38 of the wall 30. The flange 32 may extend radially from the outer circular surface 40 which is opposite to the inner surface 38 in the direction of the thickness of the wall 30.

The wall 30 may receive one or more annular seals 42, for example in contact with the inner surface 38 and/or platforms 36. seals' 42 may be abradable seals, capable of crumbling at the rotor contact 12. They can provide sealing with rows of rotor blades 24. Internal shrouds 44 suspended from the stator blades 26 can seal with wipers provided on the rotor 12.

A tank 46, in particular an oil tank, is associated with the compressor 4. Both the tank and the compressor have in common the wall 30. The wall 30 may delimit the internal chamber 48 of the tank 46. The tank 46 may be circular and surround the axis of rotation of the rotor 12. Thus, the chamber 48 is arranged between the primary flow 18 and the secondary flow 20. The casing may be formed of several outer rings, each being a closed loop, the tank being formed on one of the shrouds. Alternatively, the tank may be formed of half-shells, each shell extending over 180° around the axis 14.

The tank extends axially by a certain length, preferably capable of covering at least one blade row, or at least two or at least three rows of blades.

The flange 32 is positioned axially remote from the tank 46, the distance between them being at least equal to the axial dimension of the tank 46. This allows a versatility of the system, limiting the size of the. tank and facilitating the mounting of the casing on the one hand and potentially other elements around the casing on the other hand.

The chamber 48 may overlap one or more rows of stator blades 26, and may optionally overlap axially a seal 42 and/or rotor blades 24. It may be positioned axially at the same position as one or more rows of platforms 36. The stator blades 26 may extend radially from the platforms 36 in the primary flow-path, which is traversed in particular by the primary flow 18. The chamber 48 may be axially at the same position as at least one or more rows of blades.

The tank 46 may be partitioned using a plurality of annular portions. It may include an upstream annular partition 50 and a downstream annular partition 52. It may include an outer annular partition 54 surrounding the outer surface 40, and/or connecting the upstream and downstream partitions 50, 52. The wall 30 and the partitions 50, 52 and 54 enclose the chamber 48, especially in a sealed manner.

The upstream 50 and downstream partition 52 may be axially aligned with two rows of stator blades 26. The chamber 48 may be in thermal contact with the stator blades 26 via the wall 30. For example, the upstream partition 50 may be in thermal contact with a row of blades 26, and/or the downstream partition 52 may be in thermal contact with a row of blades 26, possibly a different row than the upstream partition 50. Thus, the partitions 50 and 52 can also be cooled by the primary flow 18, and then can cool the oil.

The partitions (50-54) and the wall 30 may form a one-piece assembly and be optionally integral.

Optionally, the partitions (50-54) and the wall 30 may be, formed of one-piece angular sections and assembled formed. Each angular section may comprise a plurality of blades 26, for example from ten to twenty. The angular sections can be produced by additive manufacturing, then be connected to each other end-to-end angularly, for example by welding or gluing. Seals may be added to the angular interfaces of the sections, for example in the direction of the thickness of the partitions and the wall. Thus, the casing 28 and the tank 46 reinforce one another.

The chamber 48 may be connected to a de-icing device of the separation nozzle 34 and/or of the stator blades 26. Pipes (not shown) may be connected to the chamber for directing an oil flow to and from the chamber 48. This design simplifies the supply of heat transfer fluid, and optimizes the defrosting.

Figure 3:
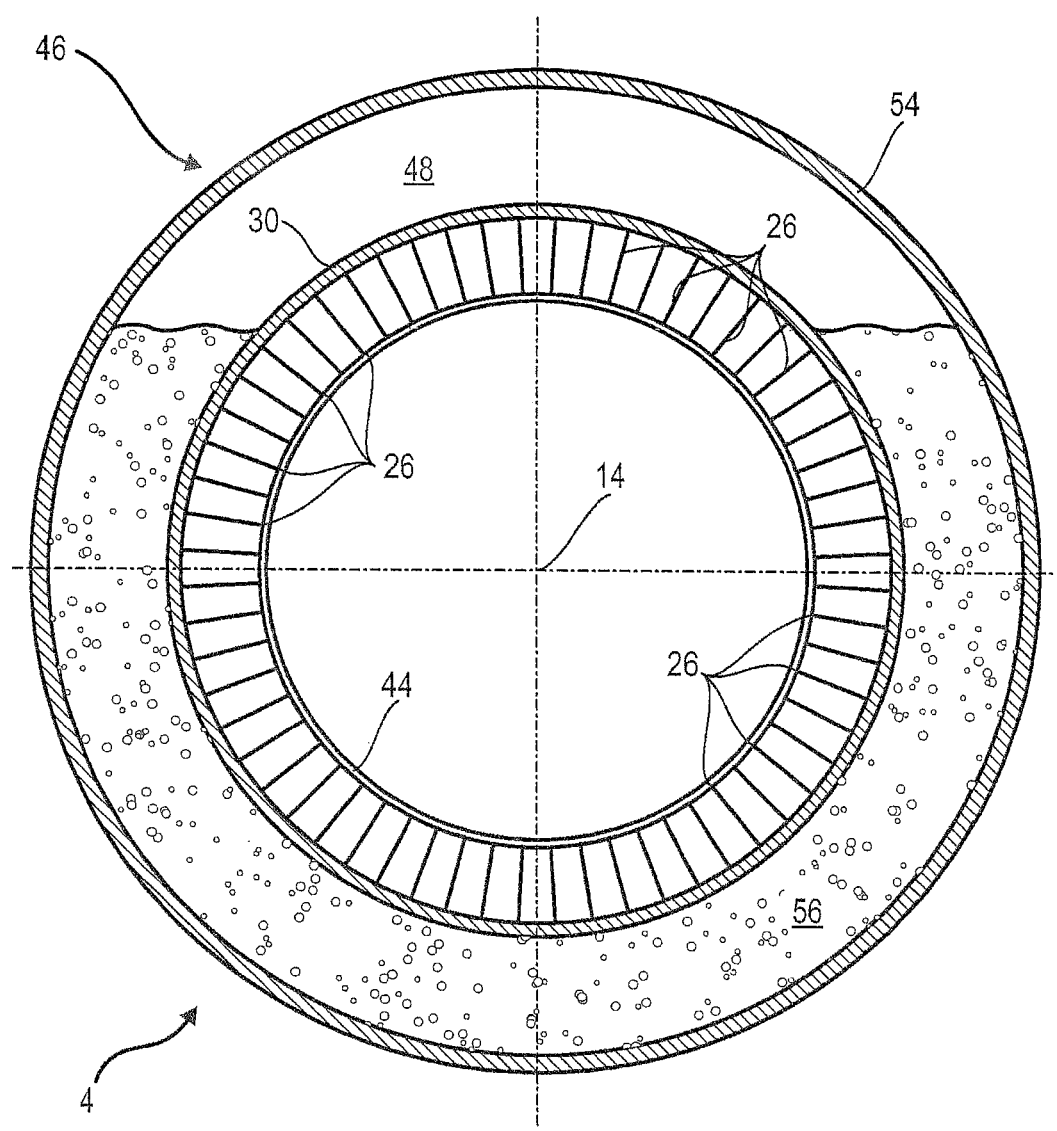
FIG. 3 illustrates a turbine engine cross-section along the axis 3-3 drawn in FIG. 2.

FIG. 3 is a cross-section of the turbine engine along the axis 3-3 drawn in FIG. 2. The annular row of stator blades 26 and the inner shroud 44 are shown around the axis of rotation 14 of the compressor 4. The number of blades 26 is here purely figurative, and may be greater than or equal to 50 or 100.

Oil 56 partially fills the chamber 48. The tank is suitable for other fluids or liquids, possibly by means of adaptations. The annular shape of the tank 46 makes its height higher than before and this improves degassing and settling of the solid particles resulting from wear. The area of the wall surfaces in contact with the chamber 48 is also higher than in prior art tanks and this promotes heat exchange.

In operation, the oil 56 can reach 200° C. It can also include additives making the oil corrosion resistant. These additives can result from the nature of the turbine engine and/or turbojet.

The wall 30 may form a tight partition and/or a structural connection between the blades 26 and the chamber 48. The outer partition 54 may surround it.

Figure 4:
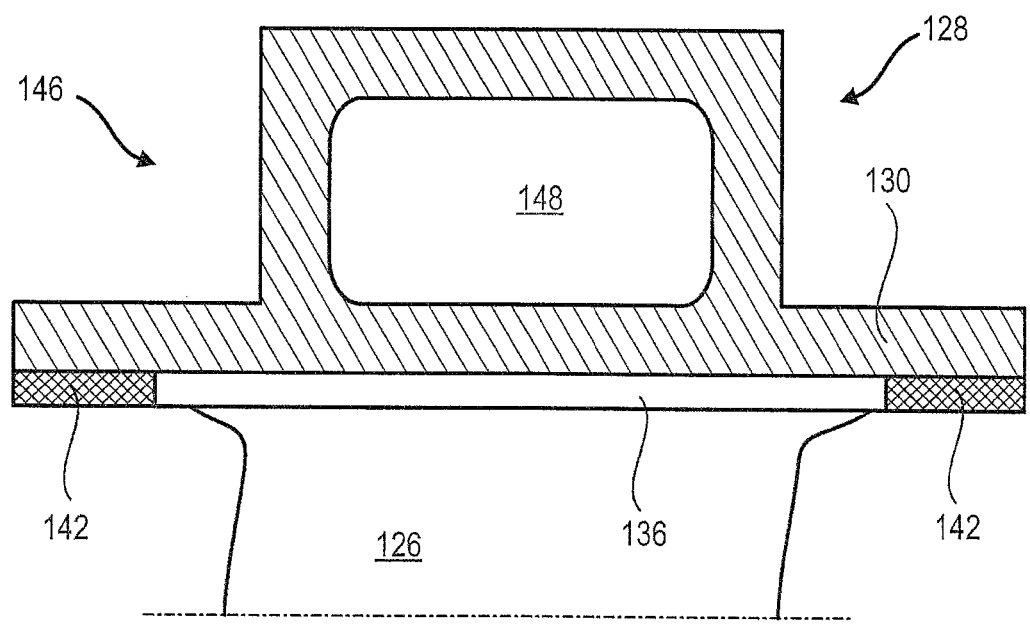
FIG. 4 shows a casing and a tank according to a second embodiment of the invention.

FIG. 4 shows a casing 128 and a tank 146 according to a second embodiment of the invention. This FIG. 4 repeats the numbering of the preceding figures for the identical or similar elements, the number being however incremented by 100.

The second embodiment is identical to the first embodiment, however, it differs in that the tank 146, and in particular its chamber 148, are arranged over the axial length of the stator blade 126, for example between its leading edge and its trailing edge, and/or in the axial length of the platform 136. The chamber 148, and optionally the tank 146 as a whole, also overlap axially spacer joints 142, positioned for example upstream and downstream of the blades 126.

Through this design, the platform 136 forms a shield which protects the chamber 148, forming a laminate with the wall 130. This design also improves the thermal conduction.

Figure 5:
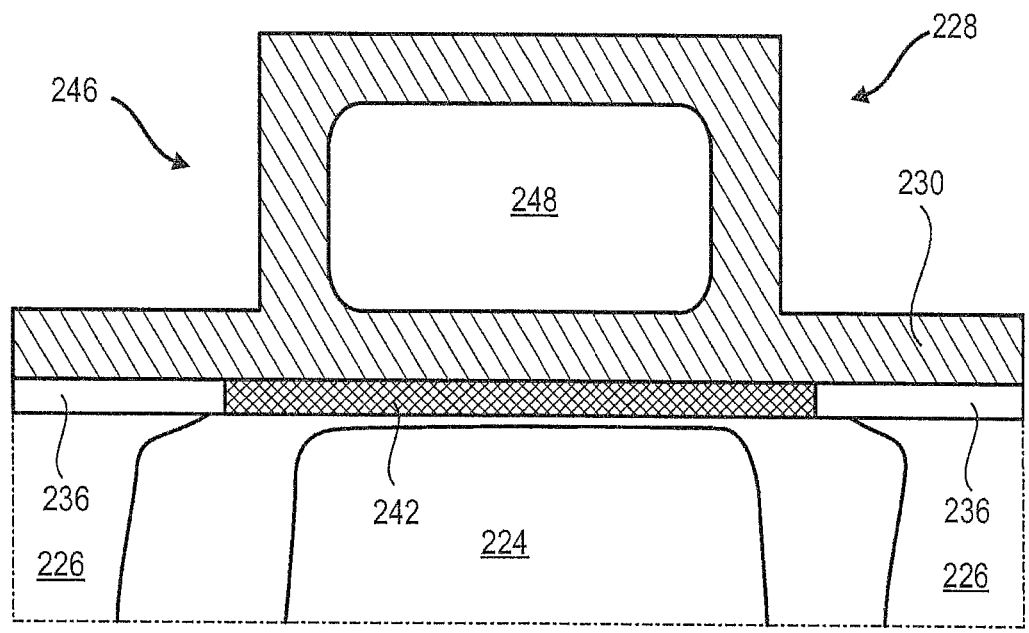
FIG. 5 shows a casing and a tank according to a third embodiment of the invention.

FIG. 5 shows a casing 228 and a tank 246 according to a third embodiment of the invention. This FIG. 5 repeats the numbering of the preceding figures for the identical or similar elements, the number being however incremented by 200. The third embodiment is identical to the first embodiment; however, it differs in that the tank 246, and in particular its chamber 248, are arranged over the axial length of a seal 242, which surrounds for example an annular row of rotor blades 224. The seal 242 can then participate in sealing the tank 246, and possibly protect it.

The stator blades 226 can be fixed using pins passing through the wall 230 of the casing 228, the tank 246 being remote axially from said pins.

The tank 246 may be axially remote from the blades of the stator blades 226. It may also be remote from the platforms 236. This arrangement favors the attachment of the blades 226 by their platforms 236, for example when the latter are welded to the wall 230. The wall 230 may comprise through-openings that are covered by the platforms.

This removes the need for fasteners of the tank, which preserves the chamber while simplifying these same fasteners, whether bonding, welding or screws, or any other equivalent means.

If these platforms had been at the axial level of the chamber, they would delimit it in combination with the wall.

According to the invention, it is possible to provide a compressor casing with several axially distributed tanks, each tank being according to one of the various embodiments of the invention.

In the present description, the features describing a blade can be applied to all the blades of the corresponding row, as well as to all the rows of blades mentioned above.

The invention claimed is:

1. An assembly for a turbine engine, comprising:
   an axis of rotation of the turbine engine;
   an outer compressor casing with an annular wall having an inner surface delimiting a primary flow-path of the compressor; and
   a tank for liquid, with an inner chamber extending around the axis of rotation, the tank having an axial dimension;
   wherein the annular wall includes an outer surface delimiting the inner chamber of the tank; and
   wherein the casing comprises:
      an annular flange extending from the annular wall and arranged axially upstream and remote from the tank, the flange and the tank being axially separated from each other by a distance that is at least equal to the axial dimension of the tank.

2. The assembly of claim 1, wherein the compressor comprises:
   at least one annular row of blades that is axially positioned upstream of the flange.

3. The assembly of claim 1, further comprising:
   a row of stator blades extending radially inwardly from the inner surface.

4. The assembly of claim 3, wherein the stator blades are arranged axially at the axial position of the inner chamber.

5. The assembly of claim 3, wherein the stator blades are in thermal contact with the internal chamber and are in thermal contat with the primary flow-path.

6. The assembly of claim 3, wherein each of the stator blades comprise:
   a fixing platform overlapping axially entirely the inner chamber of the tank.

7. The assembly of claim 3, wherein the tank comprises:
   an upstream partition and a downstream partition, each having a respective axial position, and the stator blades are positioned axially between the axial positions of the upstream partition and of the downstream partition.

8. The assembly of claim 3, wherein the tank comprises:
   an upstream partition and a downstream partition, each having a respective axial position, and one of the upstream or the downstream partitions is axially aligned with the row of stator blades.

9. The assembly of claim 1, further comprising:
   a rotor with a plurality of rows of rotor blades, the tank surrounding at least one row of the plurality of rows of rotor blades.

10. The assembly of claim 9, further comprising:
    an annular seal adapted to cooperate by abrasion with at least one row of the plurality of rows of rotor blades, the annular seal being disposed axially at the same axial position as the annular chamber.

11. The assembly of claim 9, wherein the inner chamber overlaps axially two or more of the plurality of rows of rotor blades.

12. The assembly of claim 9, wherein the wall is not hollow between the inner surface and the outer surface.

13. The assembly of claim 9, wherein the tank is an oil tank.

14. The assembly of claim 9, further comprising:
    a defrosting device, the defrosting device being fluidly connected to the tank.

15. An assembly for a turbine engine, comprising:
    an axis of rotation of the turbine engine;
    an outer compressor casing with an annular wall having an inner surface delimiting a primary flow-path of the compressor;
    a plurality of rows of blades extending radially inwardly from the inner surface; and
    a tank for liquid, with an inner chamber extending around the axis of rotation, the tank comprising:
       an upstream partition and a downstream partition defining between them an axial dimension of the tank;
    wherein the annular wall includes an outer surface delimiting the inner chamber of the tank; and
    wherein the casing comprises:
    an annular flange arranged axially upstream and remote from the tank, wherein the flange and the tank are axially separated from each other by a distance that is at least equal to the axial dimension of the tank, and wherein the axial distance between the flange and the downstream partition of the tank is of at least four annular rows of blades.

16. An assembly for a turbine engine, comprising:
    an axis of rotation of the turbine engine;
    an outer compressor casing with an annular wall having an inner surface delimiting a primary flow-path of the compressor; and
    a tank for liquid, with an inner chamber extending around the axis of rotation, the tank having an axial dimension;
    wherein the annular wall includes an outer surface delimiting the inner chamber of the tank; and
    wherein the casing comprises:
       an annular flange arranged axially remote from the tank, the flange and the tank being axially separated from each other by a distance that is at least equal to the axial dimension of the tank; and
       wherein the casing is formed by two half-shells extending over 180° around the axis and the tank is formed by two half-tori.

* * * * *